B. M. MATHIAS.
WORM GEARING.
APPLICATION FILED FEB. 18, 1918.
1,299,593.
Patented Apr. 8, 1919.
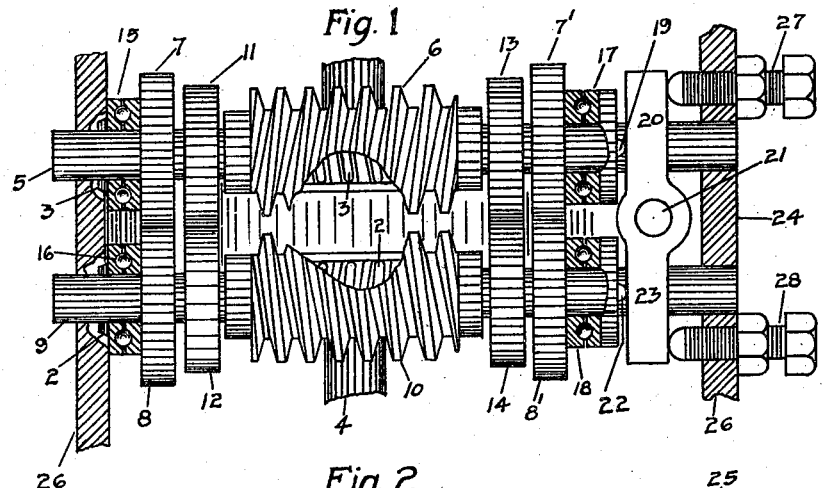
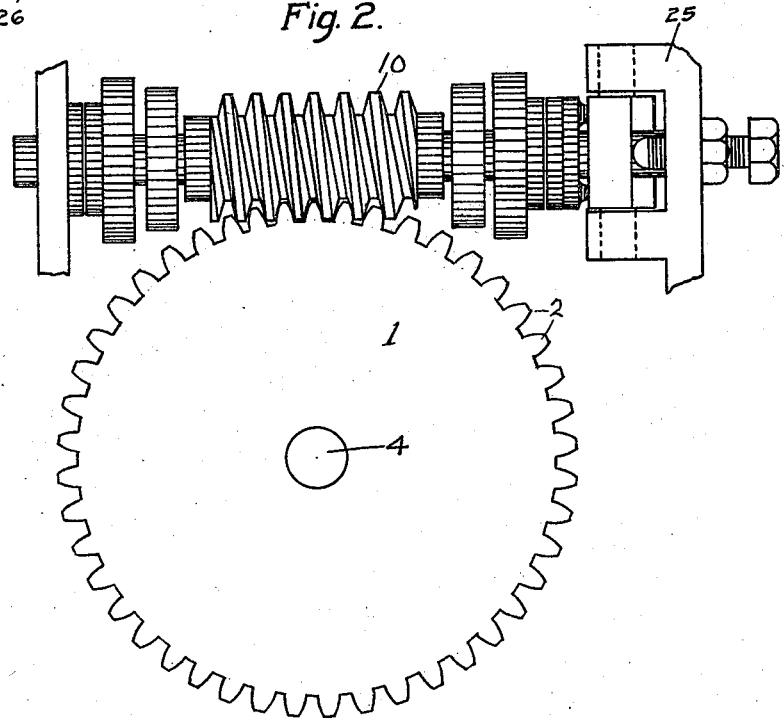
Inventor
Berton M. Mathias.
By C. D. Enochs
Attorney

UNITED STATES PATENT OFFICE.

BERTON M. MATHIAS, OF MINNEAPOLIS, MINNESOTA, ASSIGNOR OF ONE-HALF TO C. D. ENOCHS, OF EAST SHORE PARK, MINNESOTA.

WORM-GEARING.

1,299,593.              Specification of Letters Patent.       Patented Apr. 8, 1919.

Application filed February 18, 1918. Serial No. 217,989.

*To all whom it may concern:*

Be it known that I, BERTON M. MATHIAS, a citizen of the United States, and a resident of Minneapolis, in the county of Hennepin and State of Minnesota, have invented certain new and useful Improvements in Worm-Gearings, of which the following is a specification.

One object of my invention is to provide, in a worm gearing, improved means for decreasing the tooth pressure on a worm gear.

Another object of my invention is to provide simplified means for obtaining a high ratio of reduction in a worm and gear transmitting heavy pressures without unduly increasing the diameter of the gear.

Another object of my invention is to provide, in a multiple worm and gear, means for equalizing the tooth pressure on the sets of worm and gears.

With these and incidental objects in view the invention consists of certain novel features of construction and combination of parts, the essential elements of which are hereinafter described with reference to the drawing which accompanies and forms a part of this specification.

In the drawing Figure 1 is a plan view of a worm gearing embodying my invention with parts broken away to better show the construction, and Fig. 2 is a side elevation of the same.

In my preferred construction I employ a worm gear 1, Fig. 2, having two sets of teeth 2 and 3, Fig. 1, cut thereon so as to constitute a double worm gear with oppositely disposed teeth.

The worm gear is supported by a shaft 4, Fig. 1, incased in a suitable housing 26, and this housing also supports the driving shaft 5, Fig. 1, to be connected to any suitable driving means and carrying thereon a worm 6 co-acting with the teeth 3 of the gear.

A spur 7, keyed or otherwise suitably fastened to the shaft 5, drives a spur gear 8, similarly fastened to the shaft 9, which, in turn, carries a worm 10 co-acting with the teeth 2 of the worm gear. Spur gears 7' and 8' coact similarly on the other ends of the shafts.

A pair of hardened steel rollers 11 and 12 at one end of the set of worms, and a similar pair 13 and 14 at the other end of the set, are provided to relieve the bearings of the shafts 5 and 9 of their side pressure.

End thrust bearings 15 and 16 are provided to take the thrust to the left hand side of the casing, and a similar set of ball thrust bearings 17 and 18 are provided on the other end to take the driving thrust of the gearing.

A pressure fork 19 transmits the pressure of the worm 6 to the end 20 of the equalizer 21, and a similar fork 22 receives the pressure of the worm 10 onto the end 23 of the equalizer 21.

This equalizer is pivoted at 24 in a fork 25 forming a part of the casing 26.

The casing 26 carries, by screw engagement, a pair of adjusting bolts or screws 27 and 28 co-acting with the ends 20 and 23, respectively, of the equalizer, and when both of these bolts are drawn snugly home the worms are maintained in their respective positions in the casing without end movement.

It is possible that, under certain conditions, the worms or gears may wear unequally, or that the spur gears will wear unequally, thus throwing a heavier pressure on one of the worms than on the other, and the equalizer 21 is provided for taking up such unequal pressures.

If the screws 27 and 28 are backed away slightly, the ends 20 and 23 will still receive the pressure from their co-acting worms, but if the pressure of one worm is slightly in excess of that of the other, the equalizer will move slightly about its pivot point 24, thus bringing the worms in equal operative relation with their respective sets of gear teeth so that the pressure may become again balanced.

The advantages of the type of gearing disclosed herein are many, one of the main advantages being that with a single thread worm it is possible to secure as great a strength of tooth as desired by merely increasing the number of worms and the number of sets of worm gear teeth cut on the worm gear, so that a worm gearing of any required strength may be made with single thread worms and having as much strength as would a quadruple worm or a worm of even an indefinite number of threads and which would, on account of the lead required, be impractical to construct with a worm and gear of the ordinary type.

It is evident therefore that the pressure on the teeth and thread may be reduced to any desired amount by this form of construction, thus allowing one to transmit any amount of power desired through a worm and gear without exceeding the allowable surface pressure compatible with proper lubrication.

While I have described my invention and illustrated it in one particular design, I do not wish it understood that I limit myself to this construction, as it is evident that the application of the invention may be varied in many ways within the scope of the following claims.

Claims:

1. In a worm gearing the combination of a worm gear having two sets of gear teeth thereon, a worm co-acting with each of said sets, a driving shaft for one of said worms, and means on said driving shaft for driving the second of said worms.

2. In a worm gearing the combination of a worm gear having two sets of gear teeth thereon, a worm co-acting with each of said sets, a driving shaft for one of said worms, means on said driving shaft for driving the second of said worms, and an equalizer associated with said shafts for equalizing the pressure between the teeth and threads of co-acting worms and worm gear teeth.

3. In a worm gearing, the combination of a worm gear having two sets of gear teeth thereon, a worm co-acting with each of said sets, a driving shaft for one of said worms, means on said driving shaft for driving the second of said worms, and pressure rollers co-acting with said worms for taking the pressure therebetween.

BERTON M. MATHIAS.

Copies of this patent may be obtained for five cents each, by addressing the "Commissioner of Patents, Washington, D. C."